United States Patent
Chao

[19]

[11] Patent Number: 6,115,551

[45] Date of Patent: Sep. 5, 2000

[54] SYSTEM FOR MINIMIZING THE NUMBER OF CONTROL SIGNALS AND MAXIMIZING CHANNEL UTILIZATION BETWEEN AN I/O BRIDGE AND A DATA BUFFER

[75] Inventor: Chia-Chiang Chao, Taiwan, China

[73] Assignee: Industrial Technology Research Institute, Taiwan, China

[21] Appl. No.: 08/825,184

[22] Filed: Mar. 27, 1997

[51] Int. Cl.[7] ...................................................... G06F 13/00
[52] U.S. Cl. ........................... 395/882; 395/325; 710/4; 710/9; 710/22; 710/31; 709/212
[58] Field of Search .................................. 395/882, 325; 710/4, 9, 22, 31; 709/212

[56] References Cited

U.S. PATENT DOCUMENTS

| | | |
|---|---|---|
| 5,191,653 | 3/1993 | Banks et al. . |
| 5,353,417 | 10/1994 | Fuoco et al. .............................. 710/126 |
| 5,361,060 | 11/1994 | Onozaki . |
| 5,426,740 | 6/1995 | Bennett ................................... 395/325 |
| 5,430,849 | 7/1995 | Banks . |
| 5,685,012 | 11/1997 | Klein ........................................ 710/14 |
| 5,890,012 | 3/1999 | Poisner .................................... 710/22 |

*Primary Examiner*—Thomas C. Lee
*Assistant Examiner*—Abdelmoniem Elamin

[57] ABSTRACT

A compound control/data channel connects an I/O bridge (IOB) and a data buffer unit (DBU) in a high performance I/O subsystem. Generally, data movements among an I/O bridge, data buffer unit, system bus and I/O bus are dominated by separate control signal groups issued from the I/O bridge. The compound control/data channel permits integration of these control signal groups onto the data channel connected between I/O bridge and data buffer unit. A data controller can control and transfer data to/from a data buffer using this unique channel, alternately, for control information and data streams.

21 Claims, 7 Drawing Sheets

SYSTEM FOR MINIMIZING THE NUMBER OF CONTROL SIGNALS AND MAXIMIZING CHANNEL UTILIZATION BETWEEN AN I/O BRIDGE AND A DATA BUFFER

FIELD OF THE INVENTION

The present invention relates to the field of I/O (input/output) data transfer, preferably between a system bus and an I/O bus. More particularly, the present invention relates to minimizing the number of control signals and maximizing channel utilization between an I/O bridge (IOB) and a data buffer unit (DBU).

BACKGROUND OF THE INVENTION

The architecture of a known computer I/O subsystem is illustrated in FIG. 1. An I/O bridge 1 was used to control data between the system bus 3 and the I/O bus 5. Multiple I/O peripheral devices were attachable to the I/O bus 5 such as a graphics device 7, SCSI (interface) 9, and/or a local area network (LAN) 11. Data transfer control between the peripheral devices connected to the I/O bus 5 and processing units connected to a system bus 3 was dominated by the I/O bridge 1.

An I/O bridge 1 included an inbound command queue 13 and an outbound command queue 15 which buffered the incoming commands issued by processors(s) such as a first central processing unit (CPU) 17, a second CPU 19, a third CPU 21 and a fourth CPU 23 of FIG. 1, each connected to system bus 3, and I/O device(s) connected to I/O bus 5. An inbound data buffer 25 and an outbound data buffer 27 contained in the data buffer unit were used for temporary storage of data transported between the system bus 3 and the I/O bus 5. Several control signal groups (system interface control signal line 29 and IOB interface control signal line 31) were issued by I/O bridge 1 to control the data buffer unit 4. Further, subsequent to issuance of the control signal groups, data channel 33 was used as a medium for data transfer.

FIG. 1 further illustrates an I/O control data bus 35 connecting I/O bridge 1 with I/O bus 5; a control bus 37 connecting I/O bridge 1 with system bus 3; and a data bus 39 connecting data buffer unit 4 with system bus 3. These buses 35, 37 and 39 are shown for completeness of FIG. 1.

I/O interface control signals 34 included "SYSCMD [x=0]", "IOCMD [y=0]" and "DATA [z=0]". SYSCMD [x=0] was used to control data transfer between the system bus 3 and the data transfer unit 4. IOCMD [y=0] was used to control the data transfer between the data buffer unit 4 and the I/O bridge 1. Finally, DATA [z=0] was used as a data medium for data transfer. Operation of the known computer I/O subsystem was as follows.

Each data transfer transaction on system bus 3 contained a data phase. The data transfer control signal group issued by the I/O bridge 1 contained signals driven in a data phase. These signals shown in Table 1 below, included the "data ready", "data bus busy" and "data" signals.

TABLE 1

| Type | Signal Names | Number |
| --- | --- | --- |
| Data Ready | DRDY | 1 |
| Data Bus Busy | DBSY | 1 |
| Data | D [x:0] | X |

Table 1

The data phase ranged from one to four clocks of actual data being transferred. A cache line transfer took four data transfers on the system bus 3. A transfer further contained wait states which extended the length of the data phase. Initially, the DRDY signal indicated that valid data was on the system bus 3 and had to be latched. The data bus owner asserted DRDY for each clock in which valid data was to be transferred. A DRDY signal could be de-asserted to insert wait states in the data phase.

The DBSY signal was used to hold the system bus 3 before the first DRDY signal and between DRDY signal assertions for a multiple clock data transfer. Finally, the D[x:0] signals provided an x-bit path between bus agents, wherein x was an integer. The DBSY was connected to I/O bridge 1 for monitoring data phase intervals and DRDY was connected to data buffer unit 4 for latching or issuing data.

Concerning data movement, two conventional aspects of data flow, from system bus 3 to I/O bus 5 and from I/O bus 5 to system bus 3 were known. The Data Movement Cycle Time (DMCT) of each aspect was evaluated. The simplest way to control the data movement in the I/O subsystem was to maintain I/O bridge 1 as a superior or master. The I/O bridge 1 monitored bus status and controlled when the data could be latched/issued from/to a bus and when the data could be transferred between I/O bridge 1 and data buffer unit 4.

FIG. 3 is a timing diagram depicting how a data buffer unit 4 transferred data from system bus 3 to I/O bridge 1, with control of data movement dominated by the control signal groups issued by the I/O bridge 1. A transaction for transferring data to I/O bus 5 as indicated by "CMD/ADDR" (command/address) in FIG. 3, was issued in clock cycle T2. CMD/ADDR represents the request phase of a bus transaction wherein the request signals transfer request information, including the transaction address and command code. In T5, a S2D (system to data buffer unit 4) command had to then be driven by the I/O bridge 1 on "System Interface" control signal line 29, followed by an LEN (length of data phase) signal driven in T6. As mentioned previously, an I/O bridge 1 could only monitor DRSY and so it drove a D2I (data buffer unit 4 to I/O bridge 1) command on "IOB Interface" control signal line 31, until clock cycle T14, after affirming that the system had entered the data buffer unit 4. Finally, the system data were driven on the "Data Channel" line 33 and transferred to I/O bridge 1 in clock cycle T15, one clock cycle after the D2I command was sampled. The DMCT associated with this data transfer took 16 cycles (T2–T18).

A timing diagram depicting data transfer from I/O bus 5 to system bus 3 is shown in FIG. 4. Firstly, an I/O device initiated a transaction to transfer data to system bus 3. In T2, an I/O bridge 5 issued a corresponding transaction on system bus 3 as soon as the I/O transaction was detected. In the meantime, an I2D (I/O bridge 1 to data buffer unit 4) command was driven on "IOB Interface" to initiate a data transfer directed to data buffer unit 4. Further, a D2S (data buffer unit 4 to system bus 3) command was driven on "System Interface" to inform data buffer unit 4 to drive the received data to system bus 3. The DMCT associated with this data transfer took 9 cycles (T2–T11).

The drawbacks of the aforementioned known mechanism included the relatively complex interface control signals and long DMCT.

SUMMARY

An object of the present application is to eliminate the aforementioned drawbacks and improve I/O performance.

The aforementioned and other objects of the present application are achieved by providing:

An apparatus comprising a first means for issuing a control signal to initiate data transfer; a second means for, upon receipt of the issued control signal, receiving data from a first bus; and a compound control/data channel, connected between the first means and the second means, for transporting the issued control signal from the first means to the second means under control of the first means, wherein, after receipt of the data from the first bus, the compound control/data channel transports the data from the second means to the first means, under control of the second means.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein like elements are represented by like reference numerals throughout, and wherein.

DETAILED DESCRIPTION OF PREFERRED EMBODIMENTS

Figure 5:
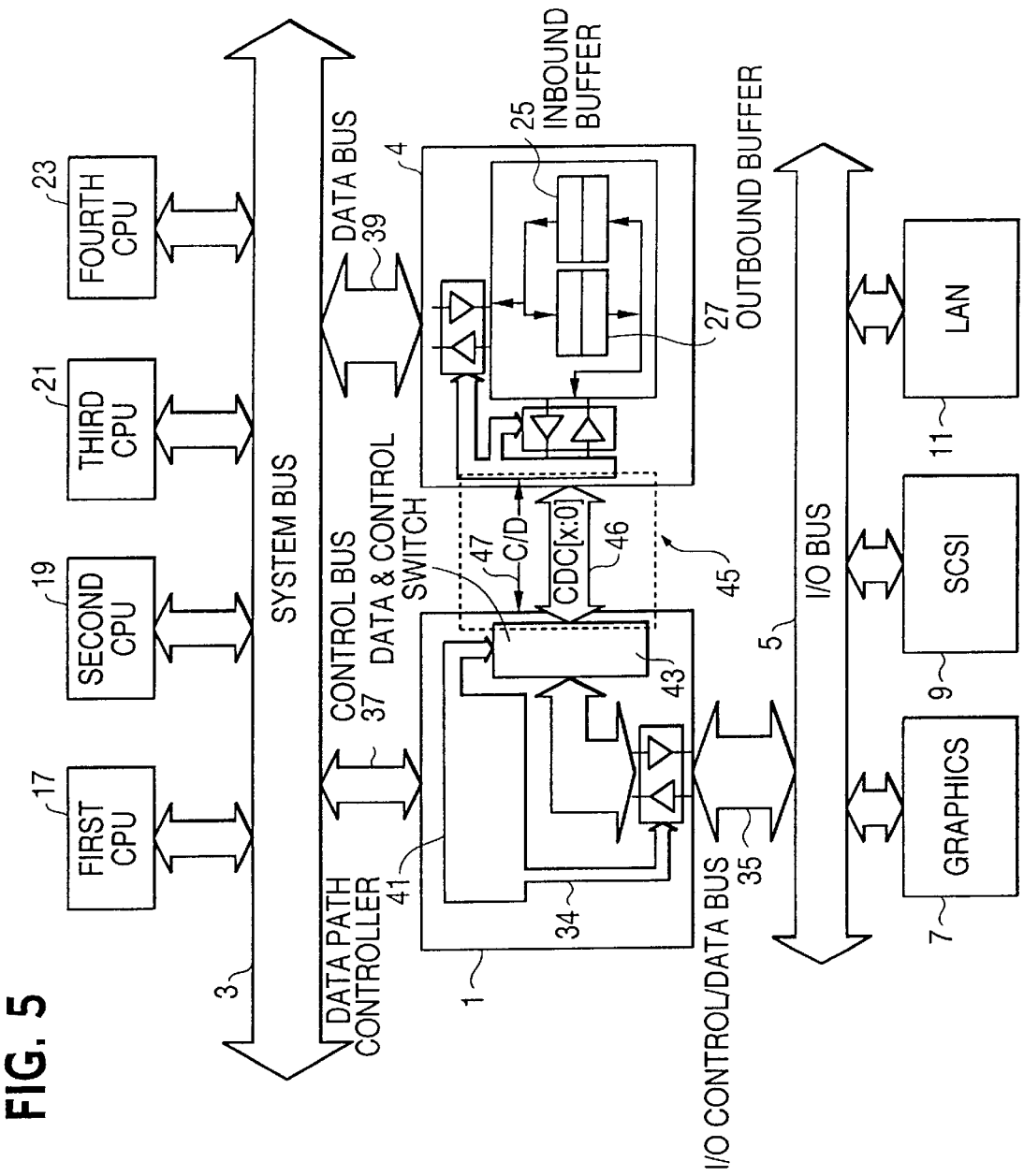
FIG. 5 illustrates an I/O subsystem of the present invention including a compound control/data channel.

As shown in FIG. 5, an I/O subsystem of the present invention includes a data buffer unit 4 coupled, by a compound control/data channel 45 including a control/data channel 46 and a mode selection line 47 (C/D#), to an I/O bridge 1. Similar to that described previously, DSBY is connected to I/O bridge 1 for monitoring a data phase interval and DRDY is connected to data buffer unit 4 for latching or issuing data.

To detect which CPU (17, 19, 21, 23) wants to transfer data and which peripheral device (7, 9, 11) is to receive the data, or vice-versa, there is a system bus arbitor (not shown) located in I/O bridge 1. The system bus arbitor decides which CPU can access system bus 3. The system bus arbitor can adopt a different arbitration policy depending upon different implementors. The CPU indicates which peripheral device is to receive the data by providing a destination address on a bus transaction. There is also an I/O bus arbitor (not shown) located in the I/O bridge 1 for I/O bus 5 access arbitration in the same manner as previously described regarding system bus 3 access arbitration.

The I/O bridge 1 includes a data path controller 41 for accepting a bus transaction from system bus 3 or I/O bus 5 and for determining a data routing path. The data path controller 41 is connected to a data and control switch 43. The data and control switch 43 is controlled by data path controller 41 and mode selection line (C/D#) 47, wherein CDC [#:0] signals are received separately for each step of data routing.

System transfer data between data buffer unit 4 and I/O bridge 1 occurs via the compound control/data channel 45. Further, data movement between different interfaces (system interface, memory interface or I/O interfaces) is also controlled via the compound control/data channel 45. Control signals and data streams are alternately applied to the compound control/data channel 45 as will be explained as follows.

The compound control/data channel 45 is initially idle when no data transfer is occurring on either the system bus 3 or the I/O bus 5 and is controlled by I/O bridge 1. When a data transfer transaction is detected by I/O bridge 1, the control signal information including command type, data direction, data length and others is issued and is immediately passed to data buffer unit 4 via the compound control/data channel 45. According to different directions of data flow, either I/O bridge 1 or data buffer unit 4 can take over control of the compound control/data channel 45 to transfer data as soon as possible. Therefore, pin count requirements between I/O bridge 1 and data buffer unit 4 can be greatly reduced. This is because traditional I/O interface control signals can be reduced to only one C/D# switch signal between I/O bridge 1 and data buffer unit 4. Thus, since both the data buffer unit 4 and I/O bridge 1 can act as a master to control the compound control/data channel 45, efficient data transfer can be achieved.

As shown in FIG. 5, the compound control/data channel 45 includes both mode selection line 47 (C/D#) and a control/data channel (CDC[x:0]) 46. In a command mode, the mode selection line 47 is pulled high and the control/data channel 46 is used to transfer control signals between I/O bridge 1 and data buffer unit 4. In data mode, as the mode selection line 47 is pulled low, the control/data channel 46 is used to transfer data streams between I/O bridge 1 and data buffer unit 4. Control signals and data streams are preferably alternately applied to the control/data channel 46.

The C/D# default mode of mode selection line 47 is the command mode. This signal is pulled high or low by data and control switch 43 when I/O bridge 1 is controlling the compound control/data channel 45.

Regarding data transfer from the system bus 3 to I/O bus 5, the I/O bridge 1 first detects that a data transfer is desired.

Then, the I/O bridge 1 issues control signals to the data buffer unit 4. Thereafter, incoming data from system bus 3 is dispatched to data buffer unit 4, controlled by the control signals sent along the control/data channel 46 from I/O bridge 1 as the mode selection line 47 is pulled high. The data buffer unit 4 then acts as a master to control the propagation of data, received from system bus 3, to the I/O bridge 1 through the control/data channel 46 as the mode selection line 47 is pulled low. Thus, data is transferred in an expedited and efficient manner.

Figure 3:
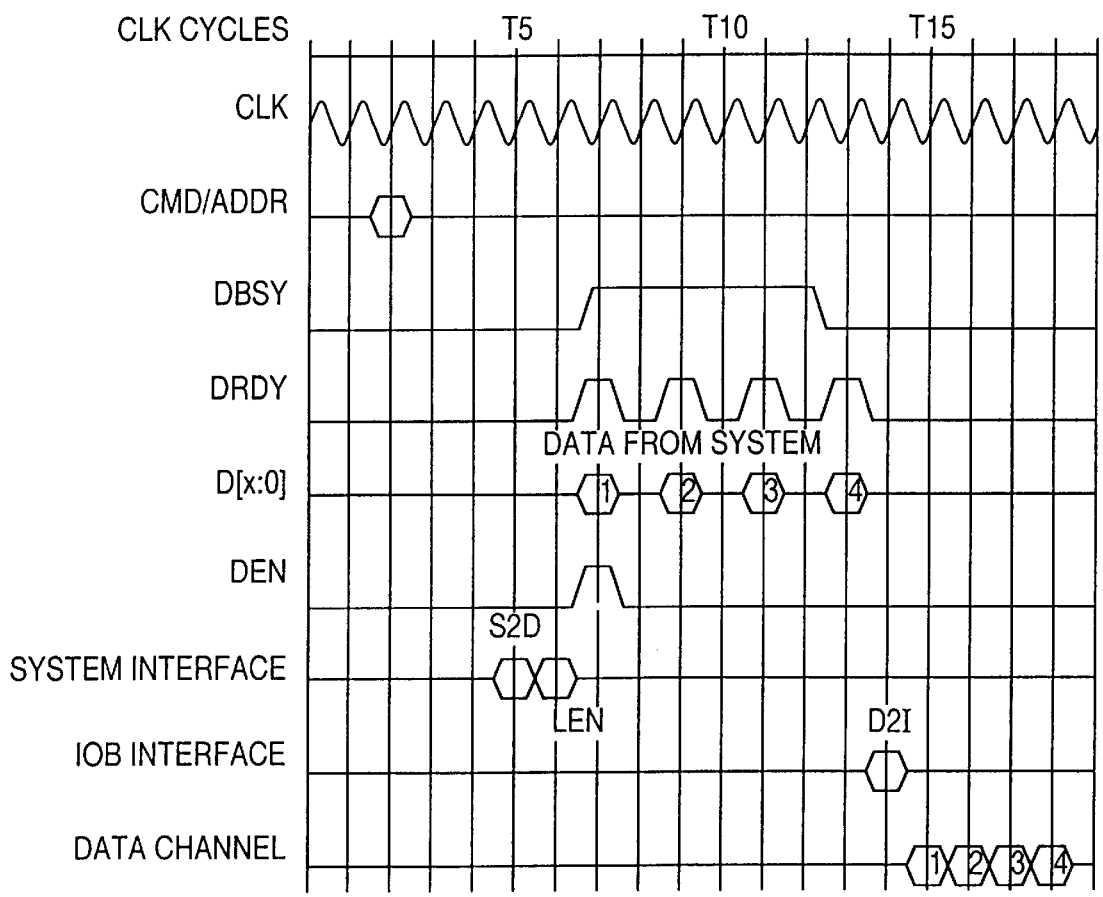
FIG. 3 illustrates a conventional timing diagram depicting data flow signals for data transfer of a data buffer unit from a system bus to an I/O bridge.
Figure 6:
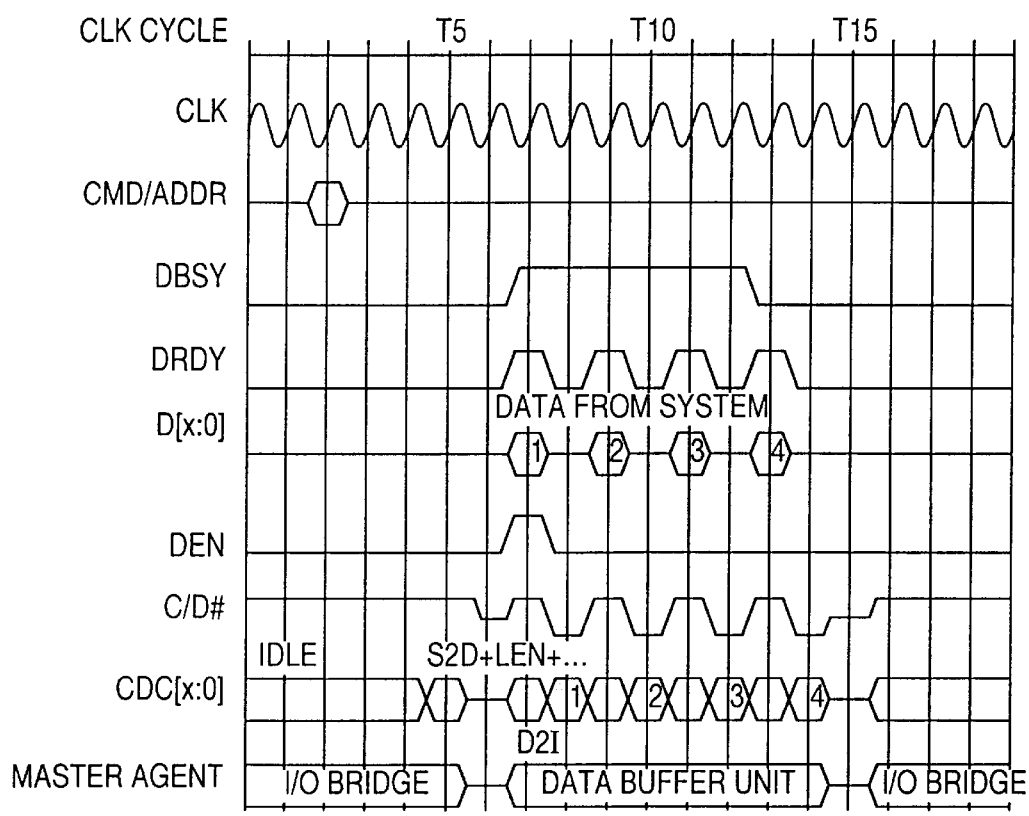
FIG. 6 illustrates a timing diagram depicting data flow signals of the present invention for data transfer of a data buffer unit from a system bus to an I/O bridge via the compound control data channel.

FIG. 6 is a timing diagram illustrating the aspect of expedited and efficient data transfer from data buffer unit 4 to I/O bridge 1 as compared to FIG. 3, for example. After I/O bridge 1 detects that a data transfer is desired, a compound command control signal including S2D, LEN and data direction is issued by I/O bridge 1 on control/data channel 46 as mode selection line 47 is pulled high in clock cycle T5. Both I/O bridge 1 and data buffer unit 4 realize that the control of the compound control/data channel 45 will be switched from I/O bridge 1 to data buffer unit 4 in clock cycle T7, one cycle after sampling the above compound command.

The switching of control is realized as follows. When the I/O bridge 1 sends the S2D command to the data buffer unit 4 via the compound control/data channel 45, the I/O bridge 1 automatically changes to be a slave module. Further, after receiving the S2D command, the data buffer unit 4 changes to be a master module.

Clock cycle T6 is referred as a channel master switch cycle. In clock cycle T7, data unit buffer 4 takes over control of the compound control/data channel 45 as shown in the master/agent (slave) time line of FIG. 6, and acts to control expeditious transfer of data received from system bus 3, to I/O bridge 1. As shown in FIG. 6, the last data is sent to I/O bridge 1 in clock cycle T14. Thus, the DMCT associated with this data transfer only takes 12 clock cycles (T2–T14).

Figure 4:
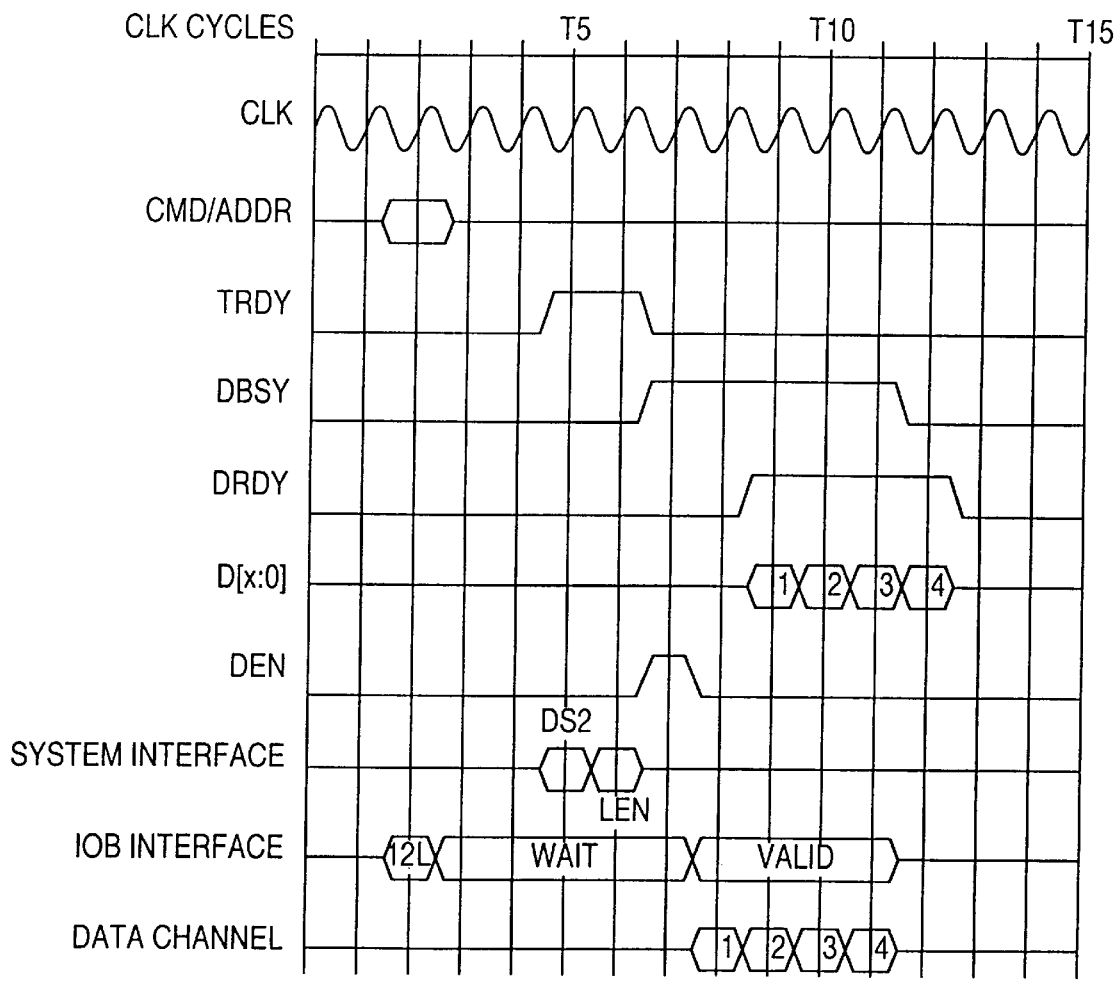
FIG. 4 illustrates a conventional timing diagram depicting data flow signals for data transfer from an I/O bus to a system bus.
Figure 7:
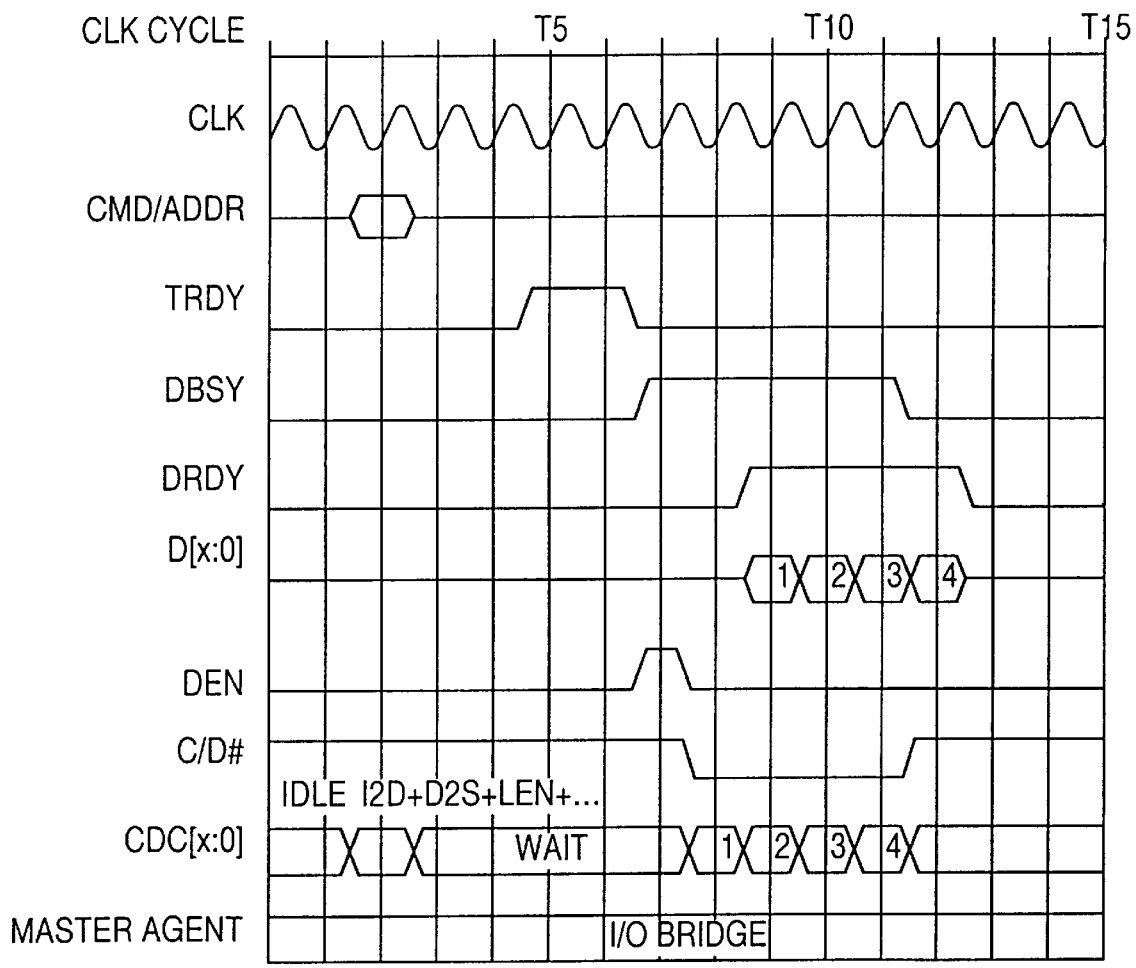
FIG. 7 illustrates a timing diagram depicting data flow signals of the present invention for data transfer from an I/O bus to a system bus via the compound control/data channel.

FIG. 7 is a timing diagram illustrating the aspect of data transfer from I/O bus 5 to system bus 3 as compared to FIG. 4, for example. Instead of sending multiple control signals groups as used in FIG. 4, the I/O bridge 1 issues a compound command control signal including I2D (I/O bridge 1 to data buffer unit 4), D2S (data buffer unit 4 to system) and LEN as a control signal on control/data channel 46 as the mode selection line 47 is pulled high. As I/O data arrives to I/O bridge 1, the mode selection line 47 is pulled low to transfer data to data buffer unit 4 via compound control/data channel 45. In this case, the compound control/data channel 46 is always controlled by I/O bridge 1 as shown in the master agent time line of FIG. 7. From clock cycles T3 to T7, wait states are inserted to control/data channel 46 with mode selection line 47 pulled high, as clock cycles data from I/O bus 5 are waited for. When a CPU intends transfer of a long burst on a data line, it may insert wait states among each data. Thus, the wait states in the control/data channel 46 are dominated by the device desiring data transfer.

Mode selection line 47 is pulled low to begin transfer of data from I/O bridge 1 to data buffer unit 4 on control/data channel 46 in clock cycle T8. The DMCT associated with this data transfer takes 9 clock cycles (T2–T11). It should be noted that in addition to efficient data transfer, the data flow does not require many control signals. Thus, the pin count requirement in the I/O subsystem is decreased due to the fact that a group of control signals between I/O bridge 1 and data buffer unit 4 are decreased to only one C/D# switch signal.

Figure 1:
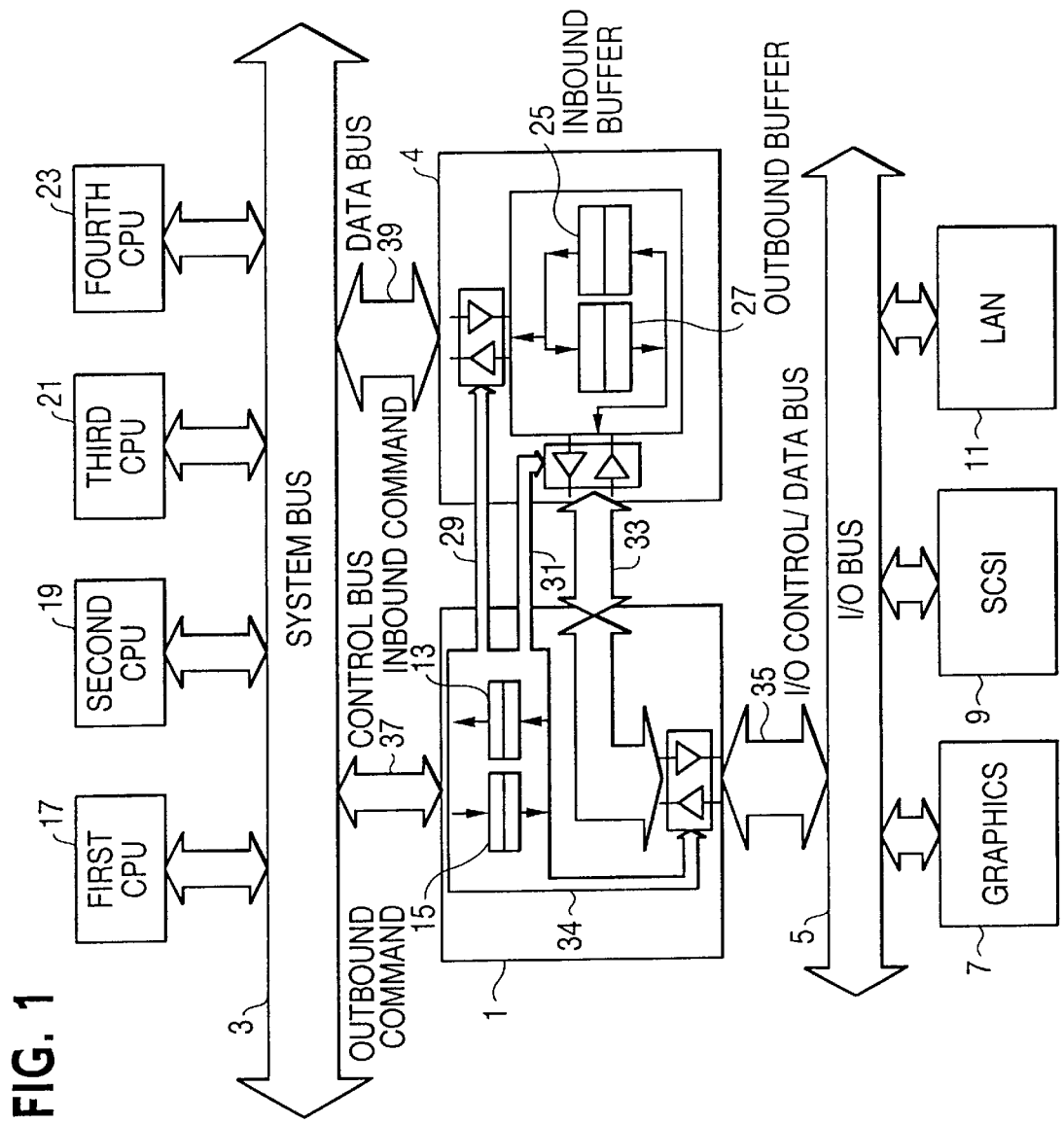
FIG. 1 illustrates a conventional I/O subsystem.
Figure 2:
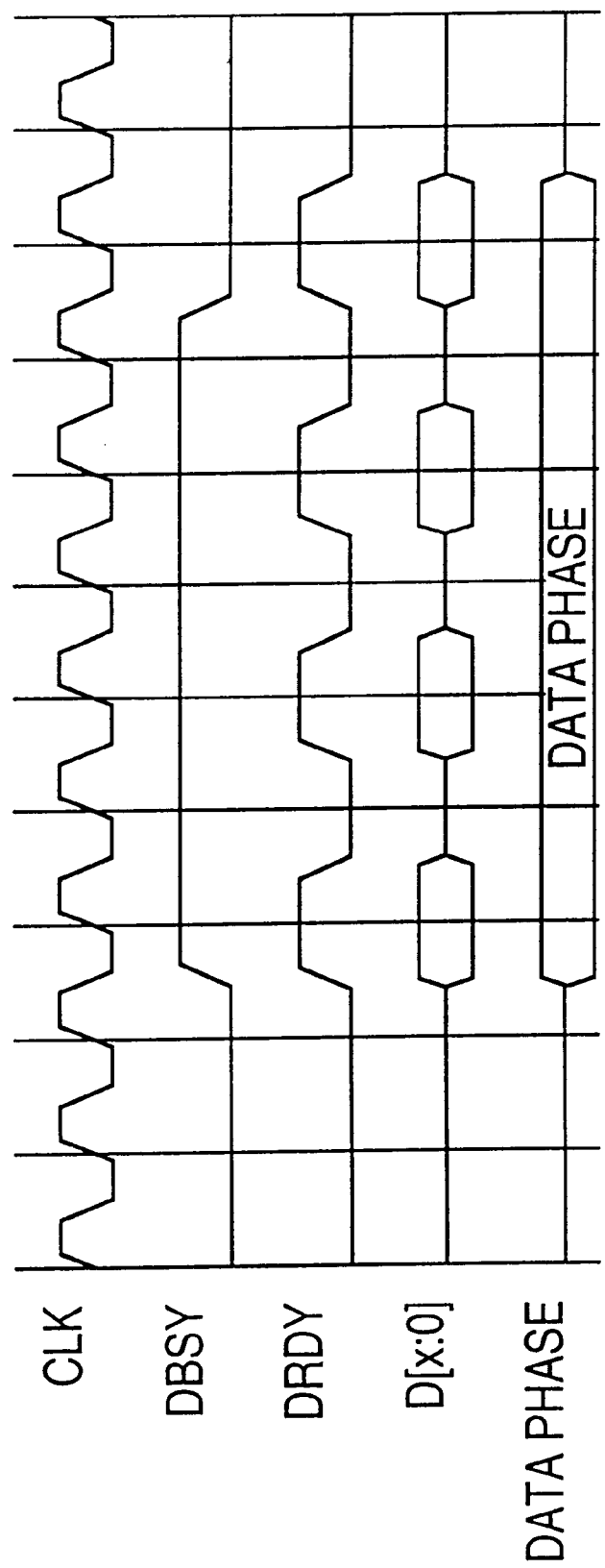
FIG. 2 illustrates data phase for data transfer transaction signals on a system bus.

Diagrams of FIG. 1, FIG. 3 and FIG. 4 illustrate I/O data transfer and timing associated with the known I/O sub-system. FIG. 5, FIG. 6 and FIG. 7 of the present invention illustrate a different way to transfer data between system bus 3 and I/O bus 5. For the known I/O subsystem, the control signals were idle for a long period of time between two consecutive data transfer transactions. The present invention uses an integrated compound control/data channel 45 to remove long idling periods and to more efficiently transfer data. Therefore, by use of such a compound control/data channel 45 more efficient I/O data transfer is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus, comprising:

an input/output bridge for issuing a control signal to initiate data transfer;

a data buffer for, upon receipt of the issued control signal, receiving data from a first bus; and a compound control/data channel, connected between the input/output bridge and the data buffer, for transporting the issued control signal from the input/output bridge to the data buffer under control of the input/output bridge, wherein, after receipt of the data from the first bus, the compound control/data channel transports the data from the data buffer to the input/output bridge, under control of the data buffer, wherein the input/output bridge transports the data received from the data buffer to a second bus, wherein said compound control/data channel includes, mode selecting means for selecting between a control node and a data mode, and a control/data channel for transporting data upon the mode selecting means selecting a data mode and for transporting a control signal upon the mode selecting means selecting a control mode, and wherein one of the input/output bridge and the data buffer controls the mode selecting means.

2. The apparatus of claim 1, wherein the second bus is an input/output bus connected to at least one peripheral device.

3. The apparatus of claim 2, wherein one of the input/output bridge and the data buffer controls the mode selecting means.

4. The apparatus of claim 1, wherein the compound control/data channel alternatingly transports control signals and data.

5. The input/output subsystem of claim 1, wherein, dependent upon a data flow direction, one of the and the data buffer controls the compound control/data channel.

6. The apparatus of claim 1, wherein transfer of the data from the first bus to the input/output bridge takes approximately twelve clock cycles.

7. The apparatus of claim 1, wherein during a period when the data buffer transfers data to the input/output bridge, the data buffer sends a control signal to the input/output bridge via the compound control/data channel every other clock cycle.

8. An input/output subsystem for transferring data from a central processing device to a peripheral device, comprising:

a compound control/data channel for transporting both including, a mode selecting line for selecting between a control mode and a data mode, and a control/data channel for transferring data upon the mode selecting line selecting a data mode and for transferring control signals upon the mode selecting line selecting a control mode;

an input/output bridge, connected between the central processing device and peripheral device and connected to the compound control/data channel, issuing control signals along the compound control/data channel upon detecting a request for data transfer; and a data buffer, connected between the central processing device and peripheral device and connected to the compound control/data channel, receiving the data from the central processing device in response to the issued control signals from the compound control/data channel and controlling the compound control/data channel to transfer the received data to the input/output bridge, wherein the input/output bridge thereafter supplies the data to the peripheral device.

9. The input/output subsystem of claim 8, further comprising:

a system bus, connected between the central processing device and the data buffer; and an input/output bus, connected between the input/output bridge and the peripheral device.

10. The input/output subsystem of claim 9, wherein the system bus is connected to a plurality of central processors and the input/output bus is connected to a plurality of peripheral devices, wherein the input/output bridge detects the central processor requesting data transfer and determines the peripheral device which is to receive the transferred data.

11. The input/output subsystem of claim 10, wherein the compound control/data channel alternatingly transports control signals and data.

12. The input/output subsystem of claim 10, wherein control of the compound control/data channel alternates between the input/output bridge and the data buffer.

13. The input/output subsystem of claim 10, wherein, dependent upon a data flow direction, one of the input/output bridge and the data buffer controls the compound control/data channel.

14. The input/output subsystem of claim 10, wherein transfer of the data from the central processing device to the input/output bridge takes approximately twelve clock cycles.

15. The input/output subsystem of claim 10, wherein the input/output subsystem is further for transferring data from a peripheral device to a central processing device wherein, the input/output bridge issues a compound control signal along the compound control/data channel upon detecting a request for data transfer and thereafter receives data from the peripheral device, the data buffer alternatingly receives the compound control signal and the data from the input/output bridge via the compound control/data channel, the input/output bridge controls the compound control/data channel to alternatingly transfer the compound control signal and the data to the data buffer, and the data buffer thereafter supplies the data to the central processing unit.

16. The input/output subsystem of claim 15, further comprising:

a system bus, connected between the central processing device and the data buffer; and an input/output bus, connected between the input/output bridge and the peripheral device.

17. The input/output subsystem of claim 16, wherein the system bus is connected to a plurality of central processors and the input/output bus is connected to a plurality of peripheral devices, wherein the input/output bridge detects the peripheral device requesting data transfer and determines the central processor which is to receive the transferred data.

18. The input/output subsystem of claim 10, wherein during a period when the data buffer transfers data to the input/output bridge, the data buffer sends a control signal to the input/output bridge via the compound control/data channel every other clock cycle.

19. An input/output subsystem for transferring data from a peripheral device to a central processing device, comprising:

a compound control/data channel for transporting both control signals and data, the compound control/data channel including, a mode selecting line for selecting between a control mode and a data mode, and a control/data channel for transferring data upon the mode selecting line selecting a data mode and for transferring control signals upon the mode selecting line selecting a control mode;

an input/output bridge, connected between the central processing device and peripheral device and connected to the compound control/data channel, issuing a compound control signal along the compound control/data channel upon detecting a request for data transfer, wherein the input/output bridge receives data from the peripheral device;

a data buffer, connected between the central processing device and peripheral device and connected to the compound control/data channel, receiving the issued compound control signal and the data from the input/output bridge via the compound control/data channel, wherein the input/output bridge controls the control/data channel to alternatingly transfer the compound control signal and the data to the data buffer and wherein the data buffer thereafter supplies the data to the central processing unit.

20. The input/output subsystem of claim 19, further comprising:

a system bus, connected between the central processing device and the data buffer; and an input/output bus, connected between the input/output bridge and the peripheral device.

21. The input/output subsystem of claim 20, wherein the system bus is connected to a plurality of central processors and the input/output bus is connected to a plurality of peripheral devices, wherein the input/output device detects the peripheral device requesting data transfer and determines the central processor which is to receive the transferred data.

* * * * *